US006052472A

United States Patent [19]

Lo

[11] Patent Number: 6,052,472

[45] Date of Patent: Apr. 18, 2000

[54] MULTI-FUNCTIONAL AUDIO AND VIDEO CONTROL BOX

[76] Inventor: Michael Lo, 17F, No. 167, Sec. 2, Hsin-Hai Rd., Taipei, Taiwan

[21] Appl. No.: 08/893,137

[22] Filed: Jul. 15, 1997

[51] Int. Cl.[7] .............................. H02B 1/00; H04R 25/00

[52] U.S. Cl. ............................ 381/123; 381/85; 381/124; 381/150; 181/148; 181/199

[58] Field of Search .................................... 381/123, 124, 381/386, 81, 80, 85, 150, 306, 333, 388, FOR 125, 165; 181/198, 199, 148; 361/683

[56] References Cited

U.S. PATENT DOCUMENTS

| | | | |
|---|---|---|---|
| D. 341,128 | 11/1993 | Rozier | D13/164 |
| 4,187,395 | 2/1980 | Hewson, Jr. | 181/48 |
| 5,130,662 | 7/1992 | Jorgensen et al. | 381/81 |
| 5,255,322 | 10/1993 | Farinelli et al. | 381/81 |
| 5,297,211 | 3/1994 | Noro | 381/81 |
| 5,479,516 | 12/1995 | Damato et al. | 381/81 |
| 5,761,320 | 6/1998 | Farinelli et al. | 381/81 |
| 5,937,074 | 8/1999 | Carver | 181/199 |

FOREIGN PATENT DOCUMENTS

| | | | |
|---|---|---|---|
| 1-164200 | 6/1989 | Japan | H04R 1/02 |
| 2-274019 | 11/1990 | Japan | 381/81 |

*Primary Examiner*—Vivian Chang
*Assistant Examiner*—Xu Mei
*Attorney, Agent, or Firm*—Rosenberg, Klein & Lee

[57] ABSTRACT

The subject invention relates to a type of multi-functional audio & video control box, comprising such components as an antimagnetic speaker box and several sets of audio/video selector whereby an audio/video connection switch box and an audio input/output speaker switch functions are completely integrated inside an antimagnetic speaker box, so as to very efficiently save space, with possible designing and combination of easily operated switches.

10 Claims, 9 Drawing Sheets

MULTI-FUNCTIONAL AUDIO AND VIDEO CONTROL BOX

BACKGROUND OF THE INVENTION

1. Field of the Invention

The subject invention relates to a multi-functional audio and video control device, particularly to a multi-functional audio and video control device integrating an audio/video converter in a magnetically shielded speaker, thus saving arrangement space on a desktop.

Conventionally, the speaker set is in pairs (left and right channels) to get a stereo effect and must be kept at a specified long distance from the amplifier. Moreover, the speaker set generally contains only wiring for audio signals and does not contain other control circuits. The internal space of the speaker set is wasted.

Furthermore, there are some popular products of audio/video signal switch boxes which are widely used, such as audio/video signal source switch boxes, hi-fi output speaker selection switch boxes, and in the computer field, computer data switch boxes and VGA switch boxes, etc. However, different switch boxes are required for different switching purposes.

In recent years, the multi-media computer has become prevalent. The equipment of a set of speakers beside the computer has become an essential necessity (even, becoming gradually popular to add sub-woofer speakers to enhance sound effects). Because of such gradual expansion of computer input/output equipment, it has become more and more important to know how to switch multiple sets of audio and video signals.

To achieve a multi-media input/output switching purpose, we have to prepare several different switch boxes. With the tabletop area occupied by the existing one or two speaker sets, there is no more extra space on the tabletop available for additional appliances.

SUMMARY OF THE INVENTION

The objective of the subject invention is to provide a multi-functional audio and video control level, which integrates a complex audio/video output/input selector in a speaker box, with selection switches to facilitate easy operation, which is so designed to effectively save the available space.

It is an objective of the subject invention to provide a multi-functional audio/video control device, whereby the arrangement space is greatly saved.

It is another objective of the subject invention to provide a multi-functional audio/video control device, utilizing the unused space within the speaker box, so that the applications thereof can be extended to add switching functions of other multiple sets of parallel-connected circuits, such as: multiple sets of telephone lines, multiple sets of microphones, multiple sets of computer data switches, or multiple sets of computer data transmission and distribution devices, etc.

To enable better understanding of the objectives, shapes, construction or device features and functions of the subject invention, the following example of an embodiment is described in detail with drawings:

DETAILED DESCRIPTION OF PREFERRED EMBODIMENT

Figure 1:
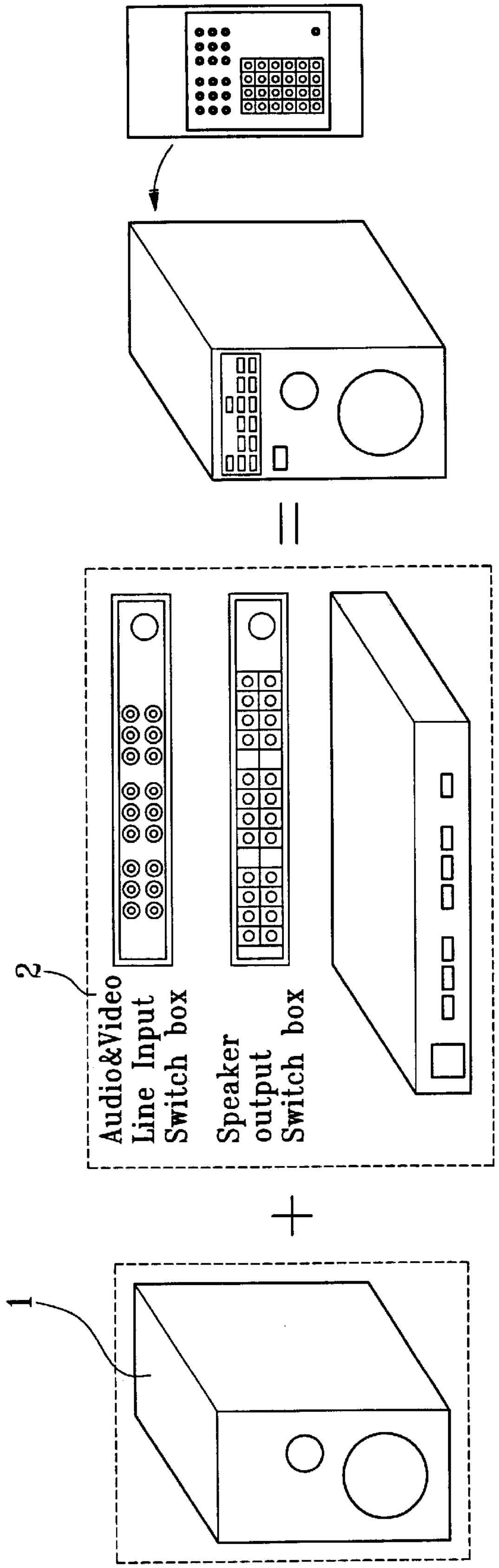
FIG. 1 is the perspective view of the subject invention.
Figure 2:
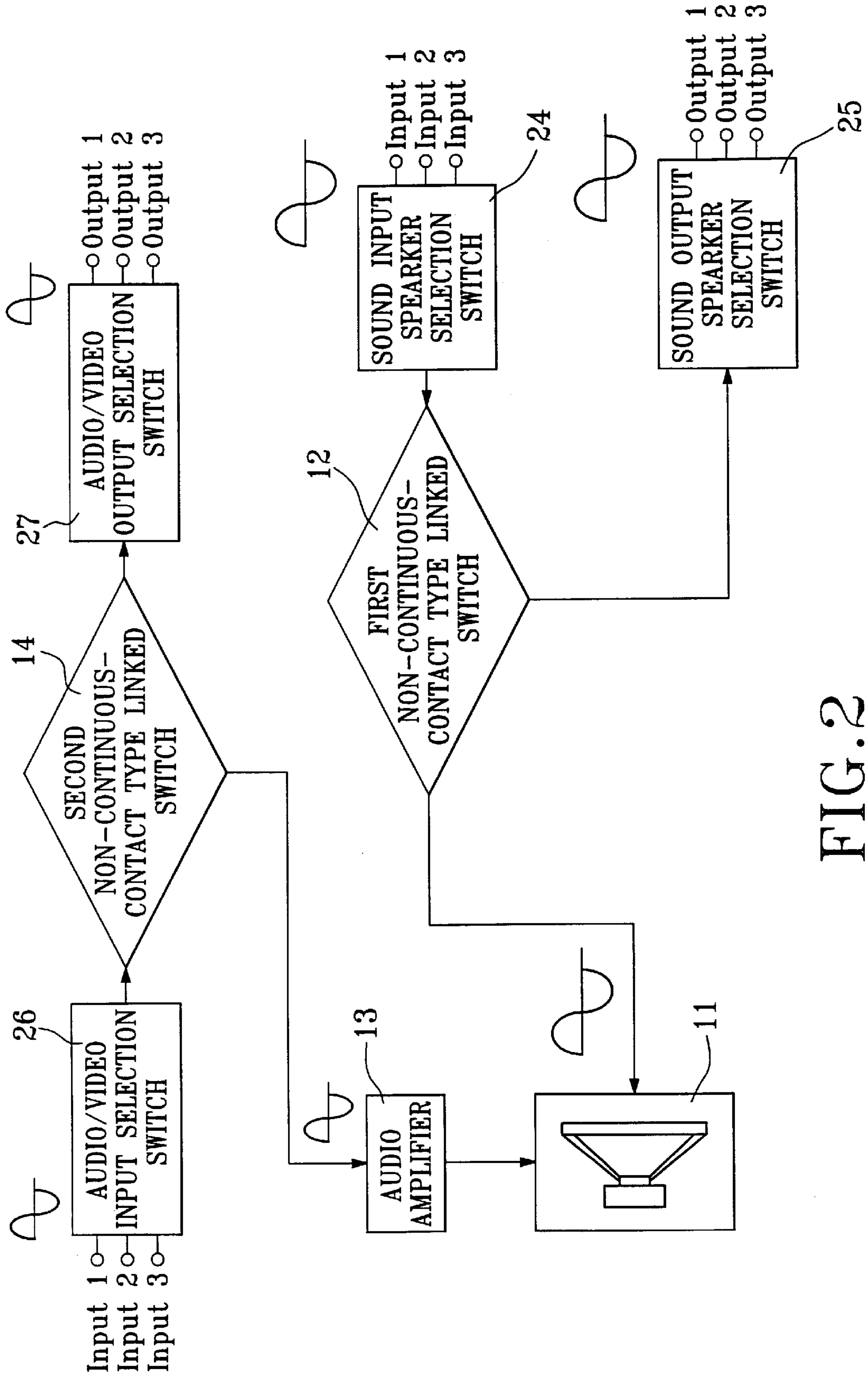
FIG. 2 is the block diagram of the internal circuit of the subject invention.
Figure 3:
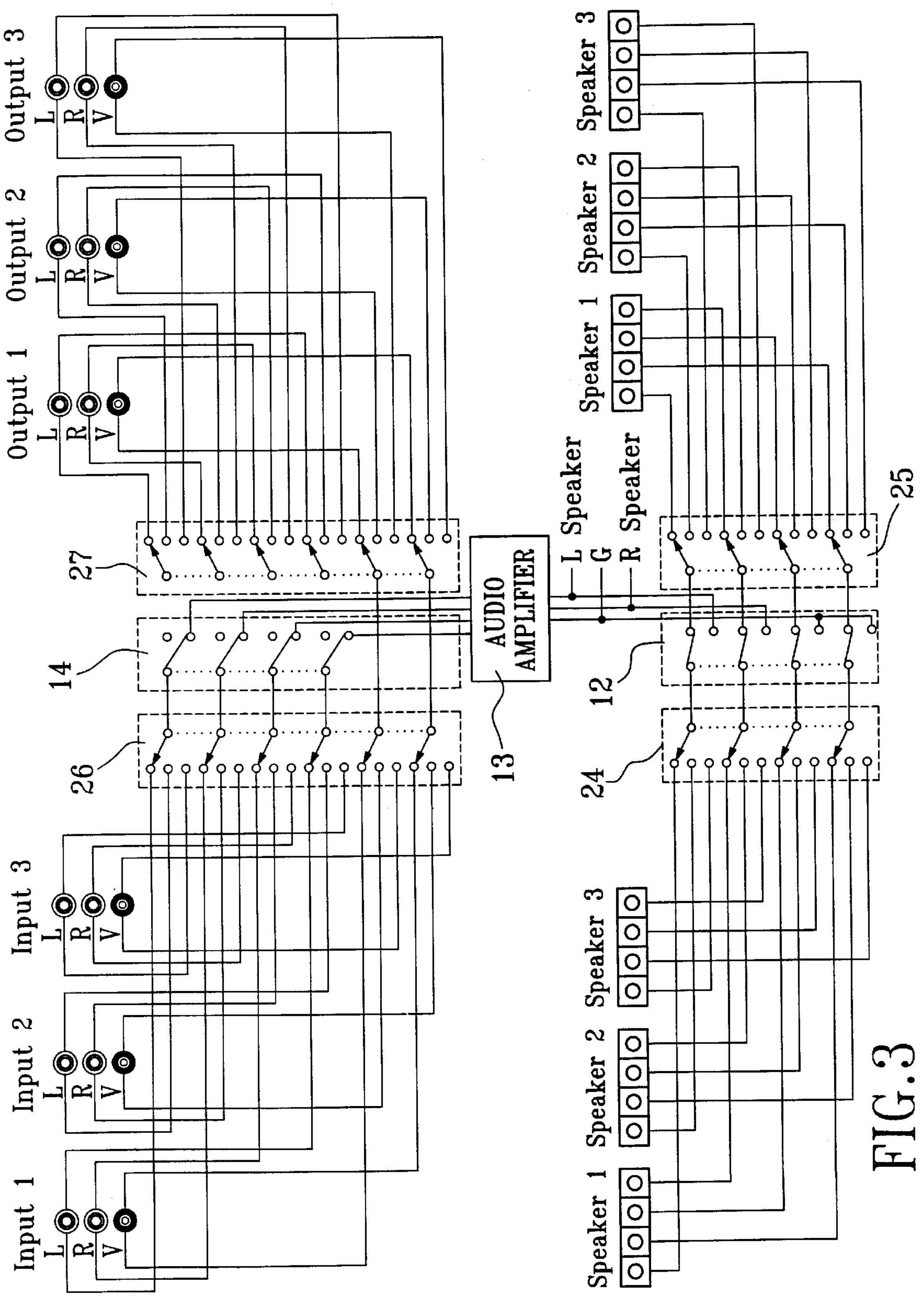
FIG. 3 is the detailed circuit diagram of FIG. 2.

Referring to FIGS. 1 to 3, the subject invention is intended to provide a multi-functional audio and video control box, which comprises speaker set 1 and several sets of audio/video converter 2, etc.

The speaker box 1 comprises a shielded main body 11, the main body 11 is connected to a first momentary push button switch 12 for audio input/output selection. In this preferred embodiment, the first momentary push button switch 12 comprises four sets of switches, the common node of each switch is connected to a normally-closed node. Each normally-open node is connected to the output of the audio amplifier 13 and is connected to the lead of the main body 11. The input of the audio amplifier 13 is connected to a second momentary push button switch 14 for audio input/output selection. In this preferred embodiment, second momentary push button switch 14 also includes four sets of switches, the common node of each switch is connected to a normally-closed node and connected to the input of the audio amplifier 13.

The audio/video converter 2 is arranged within the magnetically shielded main body 11 and comprises an audio input selection switch 24, an audio output selection switch 25, an audios/video (A/V) input selection switch 26 and an audio/video (A/V) output selection switch 27.

The audio input selection switch 24 comprises four sets of switches for audio input selection. In the preferred embodiment, there are three sets of audio inputs for the speaker set. The common node of the audio input selection switch 24 is connected to the common node of the first momentary push button switch 12.

The audio output switch 25 includes four sets of switches for audio output selection. In the preferred embodiment, there are three sets of audio outputs for the speaker set. The common node of the audio output selection switch 25 is connected to the normally-closed node of the first momentary push button switch 12.

The audio/video input selection switch 26 includes six sets of switches for A/V input selection. In the preferred embodiment there are three gets of audio/video inputs for the speaker set. The six sets of switches are connected to an A/V output socket. The common node of the A/V input selection switch 26 is connected to the common node of the second momentary push button switch 14.

The audio/video signal output selection switch 27 includes six sets of switches for A/V input selection. In the preferred embodiment, there are three sets of audio/video outputs for the speaker set. The six sets of switches of the A/V output selection switch 27 are connected to an audio/video output socket. The common node of the A/V output selection switch 27 is connected to the normally open node of the second momentary push button switch 14.

By this arrangement, the inventive multi-functional audio and video control device can save space and select speaker set for audio output and the A/V input/output signal.

Figure 4:
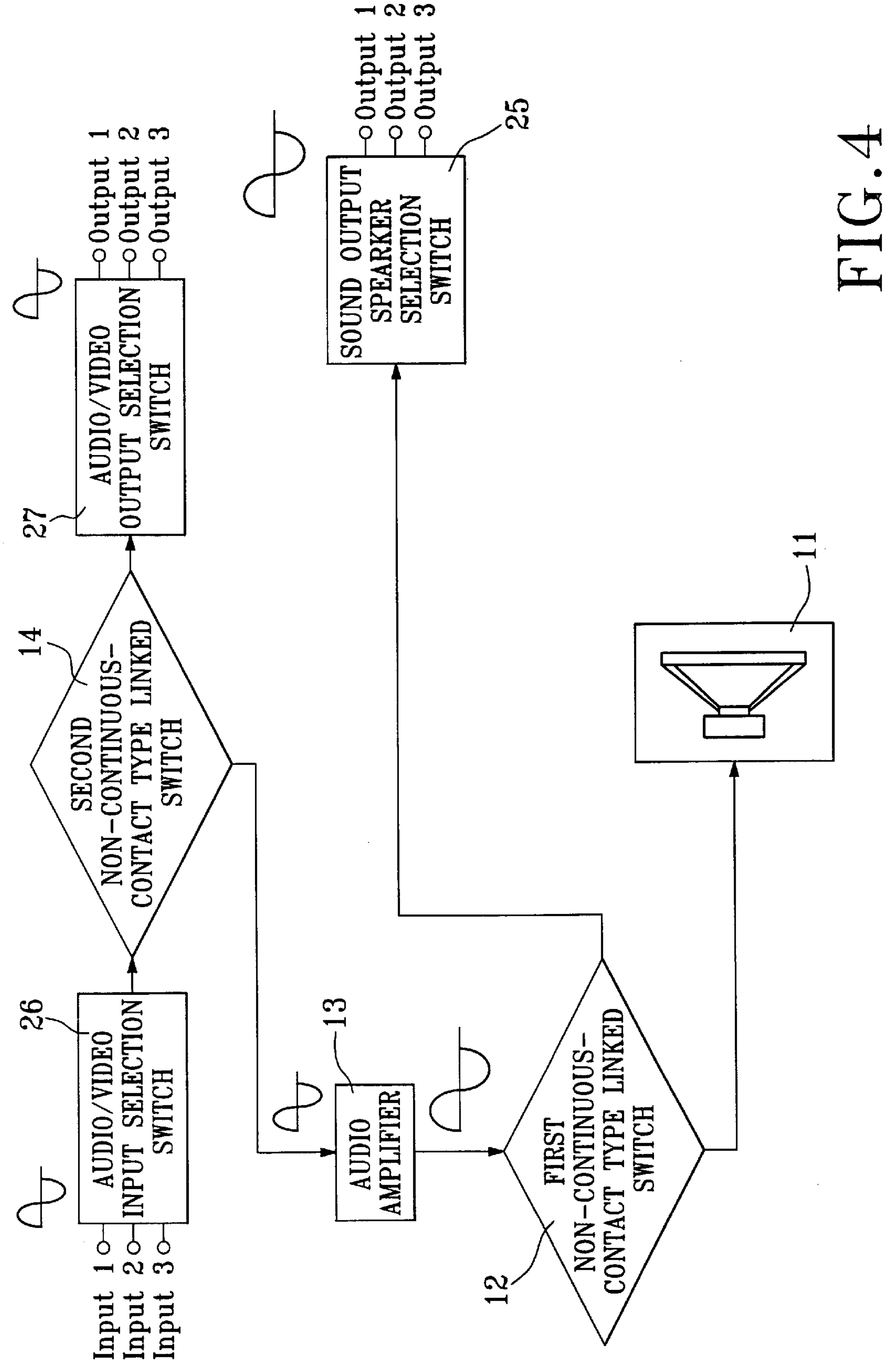
FIG. 4 is the block diagram of another internal circuit of the subject invention.
Figure 5:
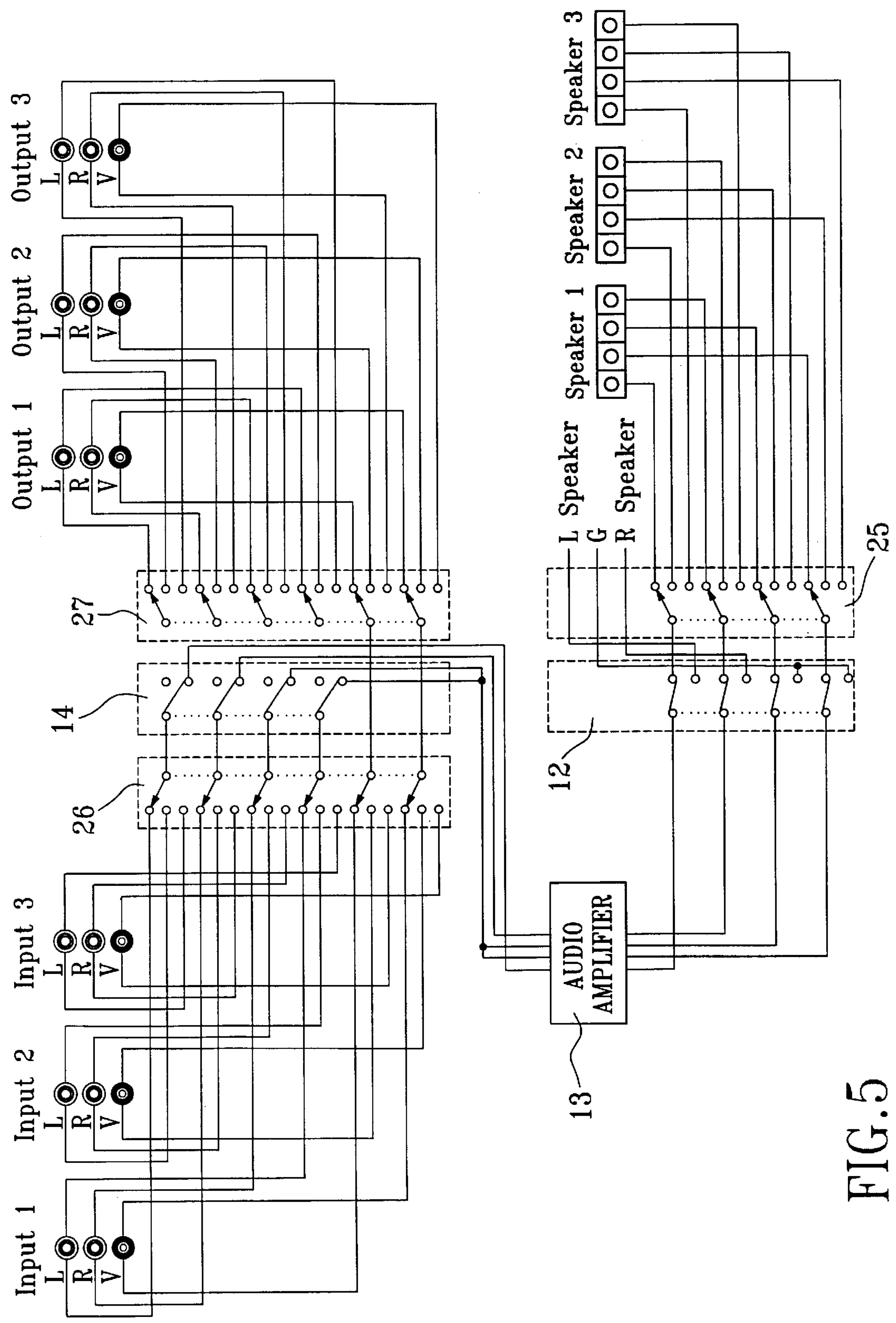
FIG. 5 is the detailed circuit diagram of FIG. 4.

In the case where the subject invention includes a speaker set with an audio amplifier, the audio input selection switch 24 and the associated three sets of audio inputs can be eliminated, as shown in FIGS. 4 and 5. The output of the audio amplifier 13 is directly connected to the common node of the first momentary push button switch 12.

Figure 6:
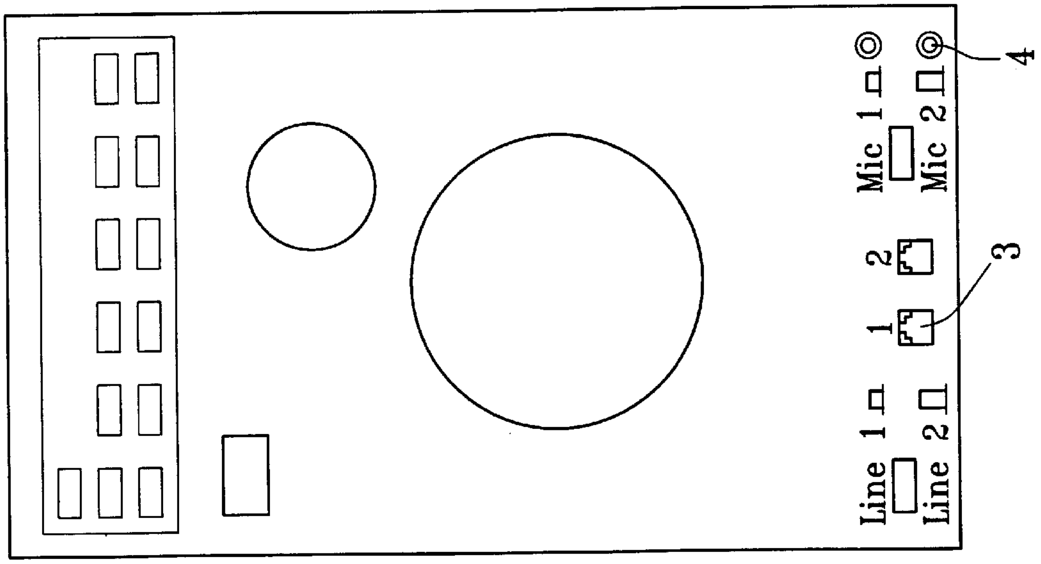
FIG. 6 is the view of the subject invention with the addition of multiple sets of microphone sets in actual application.
Figure 7:
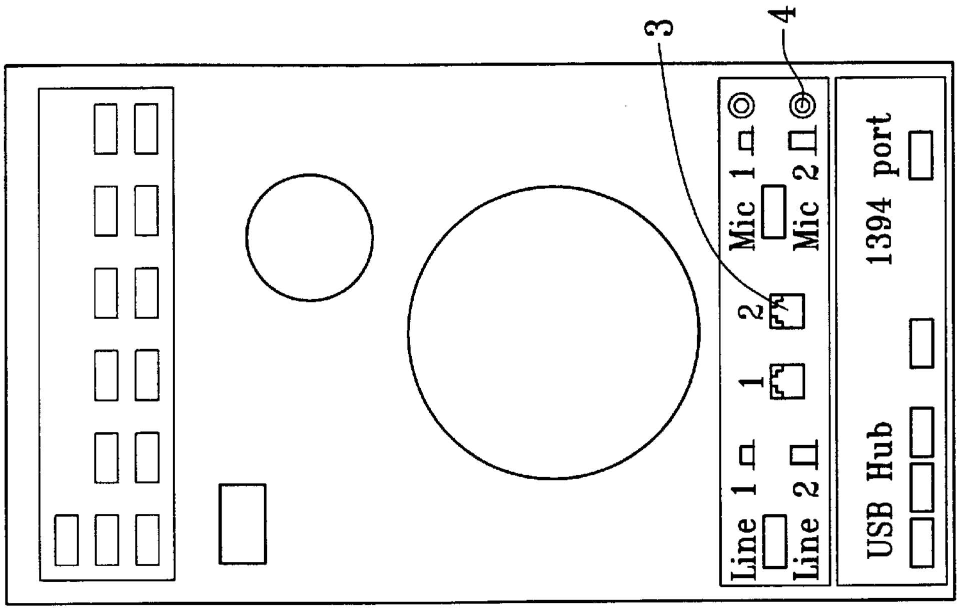
FIG. 7 is the view of the subject invention with the addition of computer data transmission and distribution in application.
Figure 8:
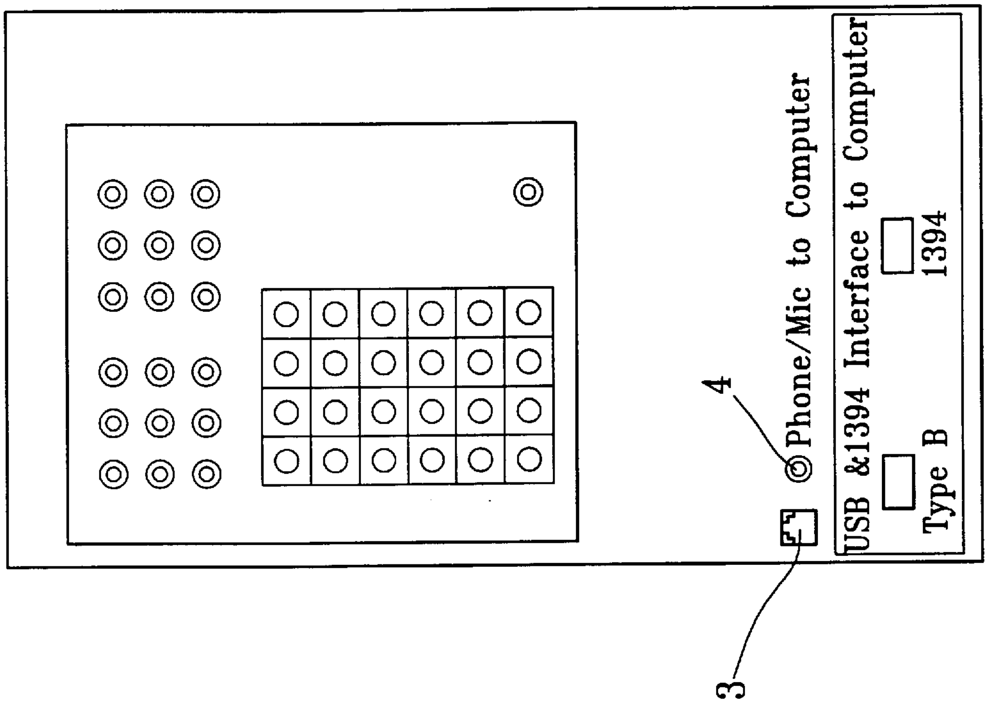
FIG. 8 is the rear view of FIG. 7.

Moreover, the invention multi-functional audio and video control device can be applied to the switch for other parallel circuitry, such as multiple sets of microphone inputs, multiple sets of telephone lines and computer data switch/distribution, as shown in FIGS. 6, 7 and 8.

Referring to FIG. 6, the unused space within the speaker box is used to accommodate the switching device for the telephone lines 3 and microphones 4, so that the speaker has a wider range of applications.

Figure 9:
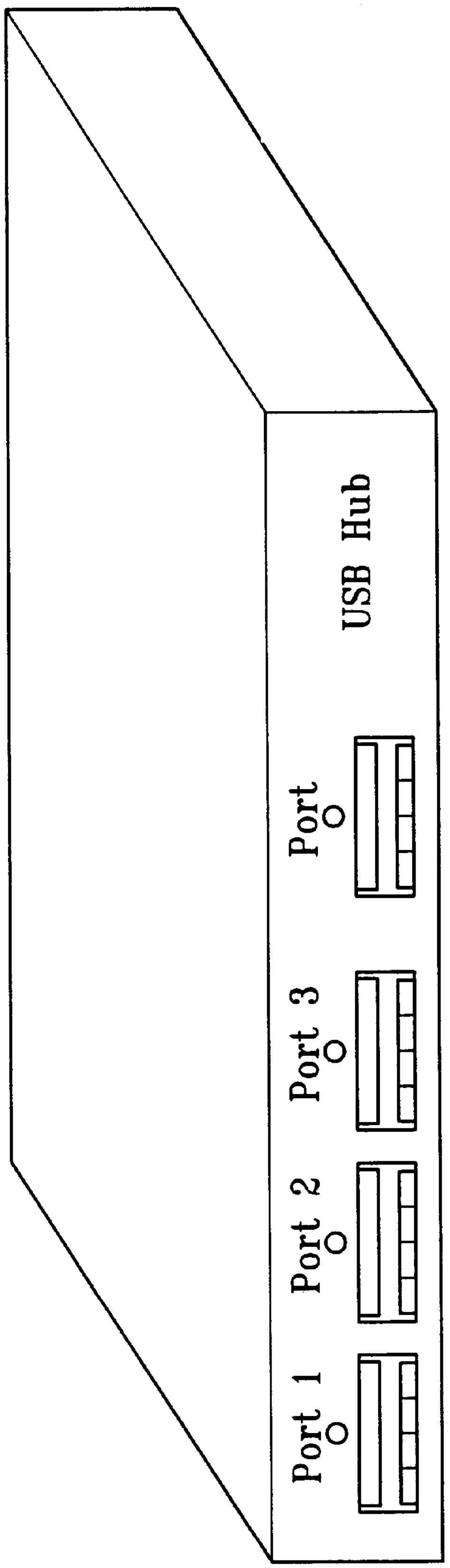
FIG. 9 is the outside view of general serial-connection extended switch box.

Referring to FIGS. 7 and 8, the unused space within the speaker box is used to accommodate the means for computer data switch/distribution, such as a universal serial bus hub (or USB HUB), as in FIG. 9. Moreover, the unused space within the speaker box is used to accommodate the means for computer data switch/distribution such as the IEEE 1394 interface for connection with computer multi-media peripherals. Therefore, the user can access the computer peripheral through the USB hub and the IEEE 1394 interface.

Summing up, the subject invention integrates the functions of an audio/video selection switching and an audio input/output selection switching into a magnetically shielded speaker set. The unused space in the speaker set can be fully utilized.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-functional audio and video control device, comprising:

a speaker set having a plurality of speakers each having a magnetically shielded main body; said magnetically shielded main body connected with a first momentary push button switch to select said speaker for audio input/output; a common node of said first momentary push button connected to a normally closed node, a normally open node thereof being connected to an output of an audio amplifier and a lead of said magnetically shielded main body; the output of said audio amplifier being connected to a second momentary push button switch for audio/video signal input/output selection, a common node of said second momentary push button switch being connected to said normally closed node;

at least one audio/video converter arranged within said magnetically shielded main body, each said audio/video converter having:

an audio input selection switch connected to the normally open node of said first momentary push button switch;

an audio output selection switch connected to the common node of said first momentary push button switch;

an A/V input selection switch connected to the normally open node of said second momentary push button switch;

an A/V output selection switch connected to the common node of said second momentary push button switch.

2. The multi-functional audio and video control device as in claim 1, wherein said first momentary push button switch has a plurality of switches.

3. The multi-functional audio and video control device as in claim 1, wherein said second momentary push button switch has a plurality of switches.

4. The multi-functional audio and video control device as in claim 1, wherein said audio input selection switch has a plurality of switches.

5. The multi-functional audio and video control device as in claim 1, wherein said audio output selection switch has a plurality of switches.

6. The multi-functional audio and video control device as in claim 1, wherein said A/V input selection switch has a plurality of switches.

7. The multi-functional audio and video control device as in claim 1, wherein said A/V output selection switch has a plurality of switches.

8. The multi-functional audio and video control device as in claim 1, further comprising an audio amplifier having an output connected to said magnetically shielded main body through said first momentary push button switch.

9. The multi-functional audio and video control device as in claim 1, further comprising means for signal switching and distribution arranged in an unused space of said magnetically shielded main body.

10. The multi-functional audio and video control device as in claim 9, wherein said means for signal switching and distribution are used for a plurality of telephone lines, a plurality of microphones and computer data switch/distribution.

* * * * *